C. M. MARSH.
TRACTOR.
APPLICATION FILED OCT. 8, 1918.

1,330,084.

Patented Feb. 10, 1920.
5 SHEETS—SHEET 1.

Witness

Inventor
Clifford M. Marsh
By
Attorney

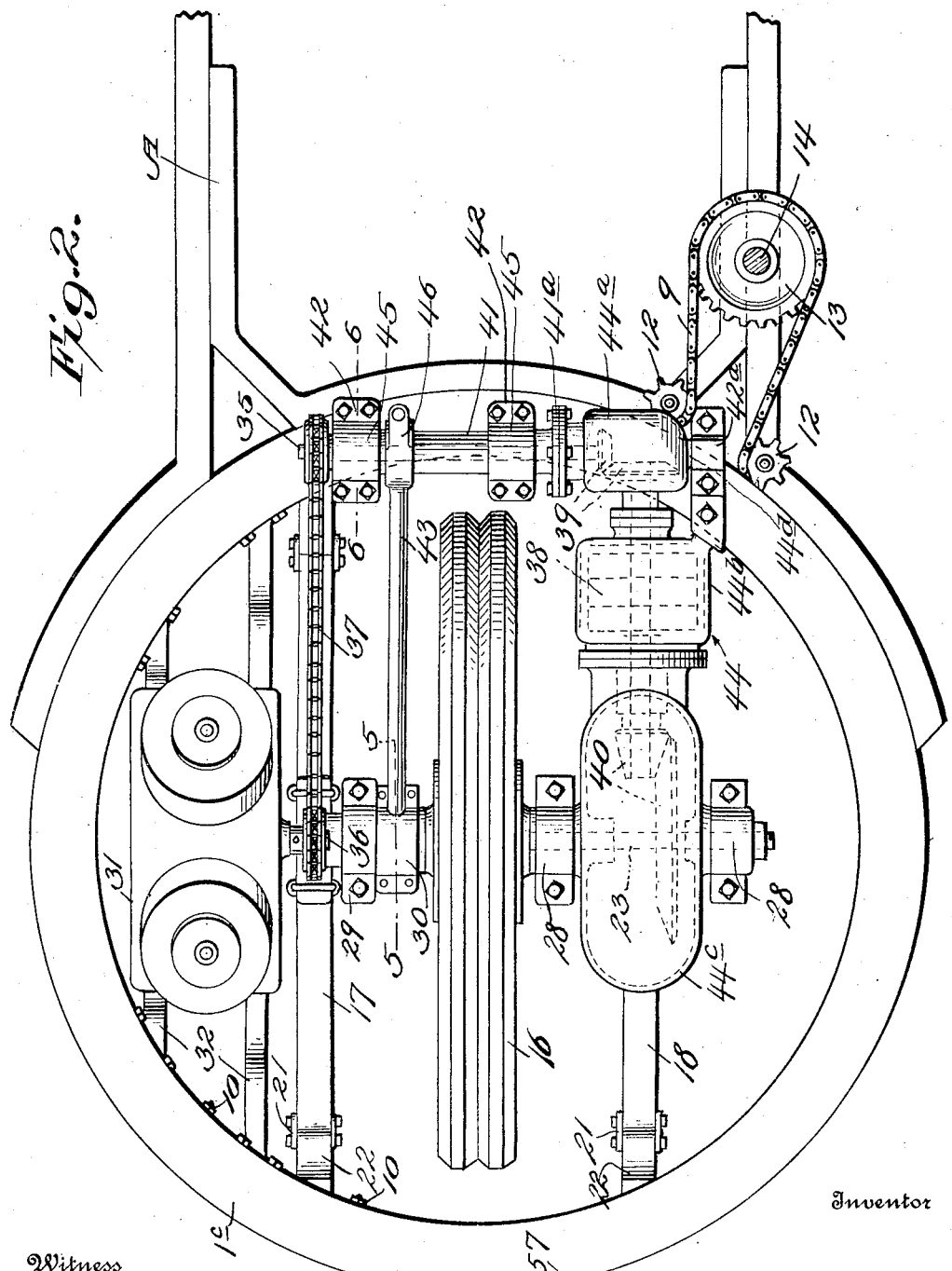

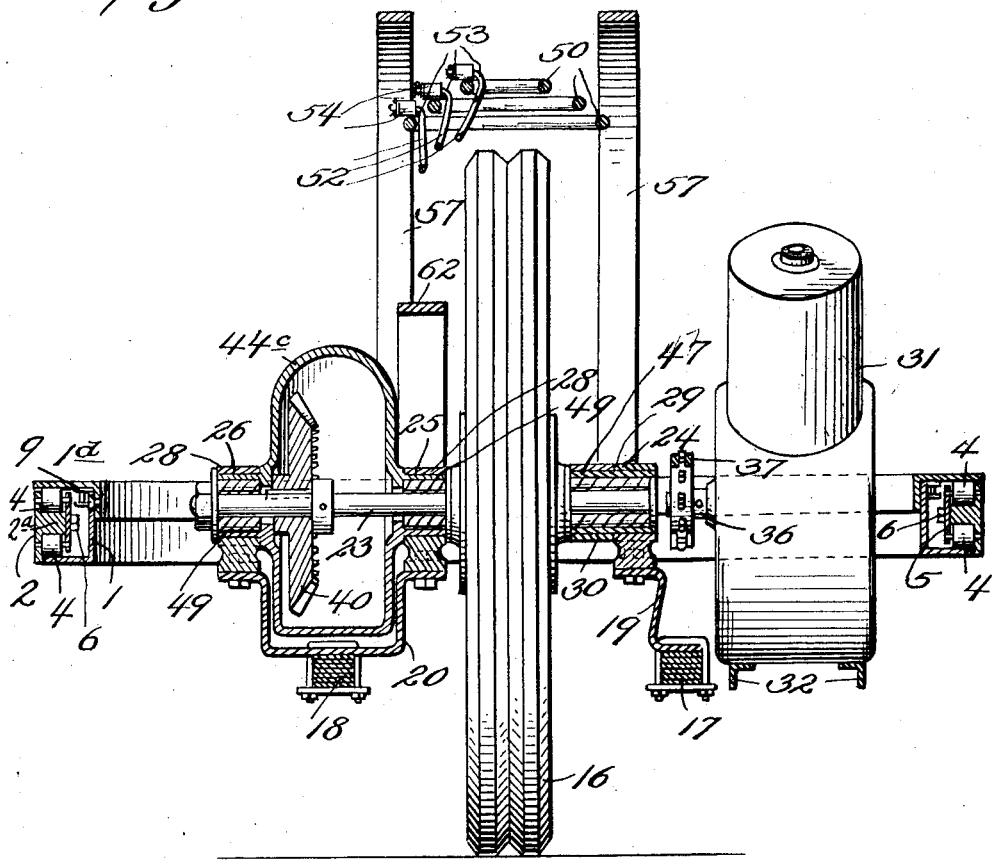

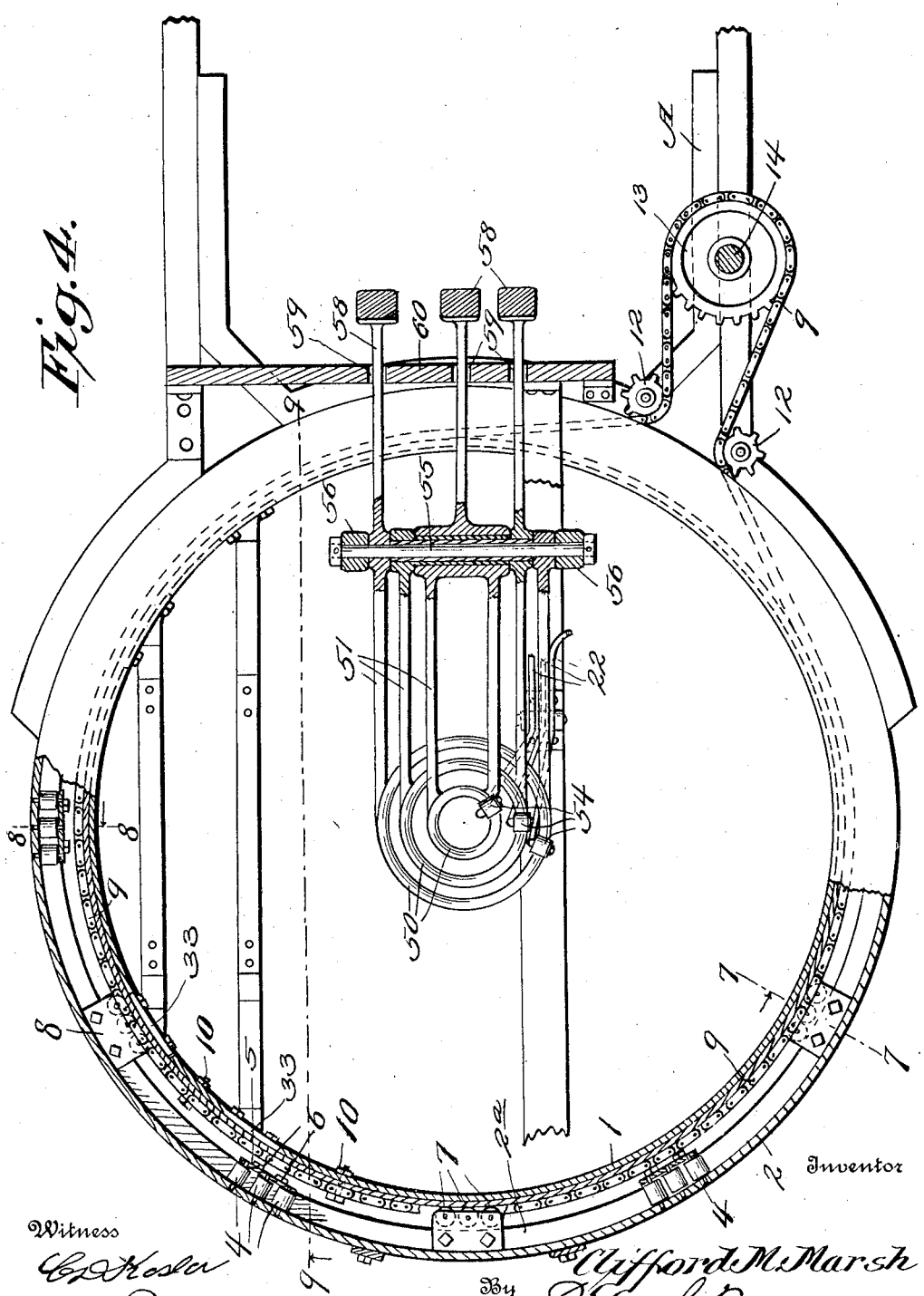

C. M. MARSH.
TRACTOR.
APPLICATION FILED OCT. 8, 1918.

1,330,084.

Patented Feb. 10, 1920.
5 SHEETS—SHEET 5.

Witness
C. D. Kesler
John Powers.

Inventor
Clifford M. Marsh
By James L. Norris
Attorney

UNITED STATES PATENT OFFICE.

CLIFFORD MYRAM MARSH, OF GLENS FALLS, NEW YORK, ASSIGNOR TO MARSH-WALTERS COMPANY, OF GLENS FALLS, NEW YORK, A CORPORATION OF NEW YORK.

TRACTOR.

1,330,084.  Specification of Letters Patent.  Patented Feb. 10, 1920.

Application filed October 8, 1918. Serial No. 257,322.

*To all whom it may concern:*

Be it known that I, CLIFFORD MYRAM MARSH, a citizen of the United States, residing at Glens Falls, in the county of Warren and State of New York, have invented new and useful Improvements in Tractors, of which the following is a specification.

This invention relates to improvements in tractors of the "one-wheel" type, proposing a tractor which is advantageously adapted to agricultural work or to hauling operations on city streets or on highways.

The principal objects of the invention are to provide for the resilient suspension of the wheel while maintaining its alinement and maintaining the substantial rigidity of the main frame, and to provide a tractor organization of exceedingly simple and durable character and having a substantially uniform or balanced distribution of the weight, in which the motor and transmission elements shall be arranged within the main frame thereby achieving compactness, in which the external vibrations and shocks reacting on the motor and connected parts are reduced to a minimum and in which the control devices may be arranged in juxtaposition and in any easily-accessible location.

With the above objects in view, the invention consists in certain novel features of structure, combination and relation which will be set forth in detail as the description proceeds.

An embodiment of the invention is illustrated in the accompanying drawings, in which:

Fig. 2 is a plan view thereof, the control devices being omitted to promote clearness of illustration.

Fig. 3 is a cross-sectional view on the line 3—3 of Fig. 1.

Fig. 4 is a sectional plan view showing details of the main frame and of the control devices.

Figure 6:
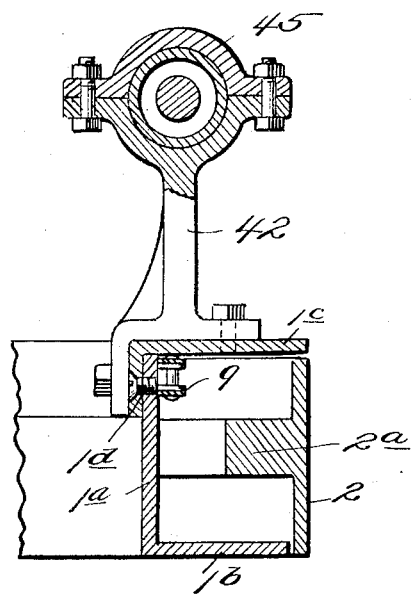

Figs. 5 and 6 are detail sectional views on the respective lines 5—5 and 6—6 of Fig. 2.

Figure 7:
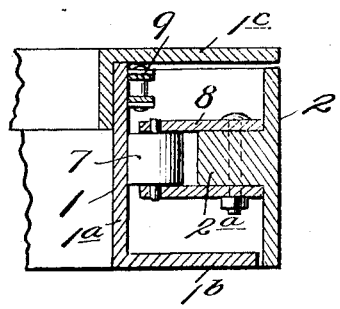
Figure 9:
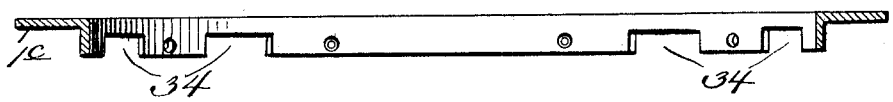
Figure 8:
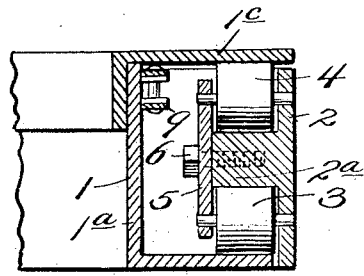

Fig. 7, 8 and 9 are detail sectional views on the respective lines 7—7, 8—8 and 9—9 of Fig. 4.

Similar characters of reference designate corresponding parts throughout the several views.

The main frame of the tractor consists of two concentric rings 1 and 2, of which one, preferably the inner ring 1, is rotatable about a central axis, and the other, the outer ring 2, is relatively stationary. The rings 1 and 2 may have any desired cross-sectional form and relation whereby they will be held against relative displacement in the direction of their common central axis and may rotate, one on the other, with a minimum of friction. For these purposes, the construction shown in Figs. 3, 4, 7 and 8 is, as now considered, preferred. As shown, the ring 1 has a channeled cross-section which affords a vertical cyindrical flange $1^a$ and circumscribing horizontal upper and lower flanges $1^b$ and $1^c$; and the ring 2 is provided with an inwardly-projecting horizontal annular flange $2^a$. The ring 1 is preferably made in two sections secured by screws or equivalent fastenings $1^d$ and the horizontal flange $1^c$ is formed on the upper section, the sections being fitted and secured to one another after the assembly of the ring 2.

The flange $2^a$ projects between and coöperates with the flanges $1^b$ and $1^c$ to prevent relative vertical displacement of the rings. Such coöperation is made effective by the arrangement of horizontal roller bearings 3 between the flanges $2^a$ and $1^b$ and of roller bearings 4 between the flanges $2^a$ and $1^c$. The bearings 3 and 4 are preferably arranged in groups disposed at regular intervals, each group conveniently consisting of three bearings 3 and three bearings 4. The pintles of said bearings are fitted in the vertical portions of the ring 2 and and in retaining plates 5 secured by screws or equivalent fastenings 6 to the flange $2^a$.

For resisting the opposed lateral thrusts of the rings vertical roller bearings 7, which roll upon the flange $1^a$, are provided. The bearings 7 are preferably arranged in groups located intermediate the groups of bearings 3 and 4 and their pintles are fitted in supporting plates 8 which are preferably secured to the flange $2^a$.

The ring 2 has attached thereto a suitable rearwardly-projecting draft or coupling frame A which may carry the driver's seat (not shown).

Figure 1:
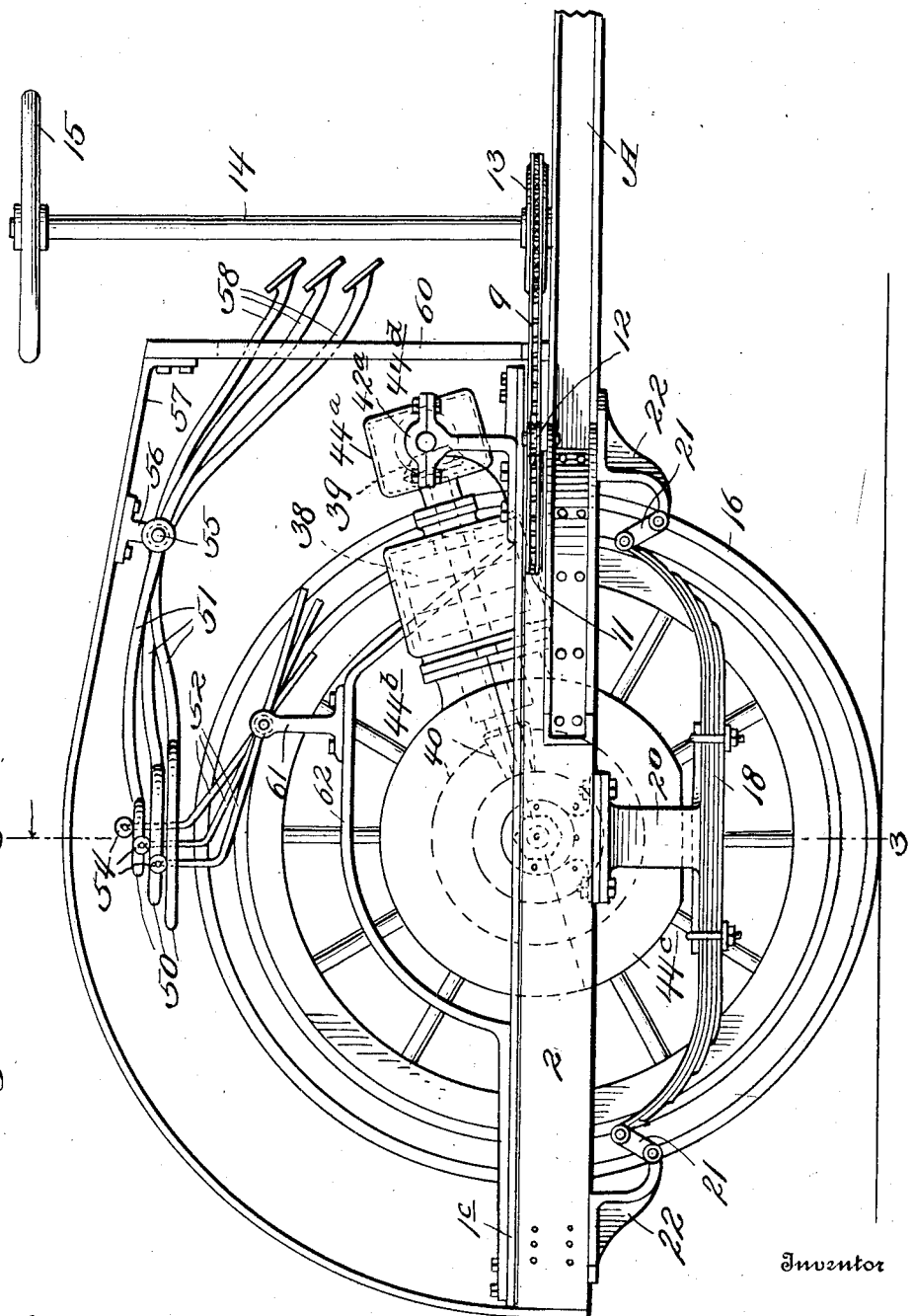
Figure 1 is a side elevation of a tractor in which the features of the invention are incorporated.

In steering, the ring 1 is turned about its central axis. Any desired steering mechanism may be employed. As shown, an endless steering chain 9 (Fig. 4) encircles the flange 1ª for the greater part of its circumference and is connected to said flange at any desired point or points 10. The chain 9 passes through a clearance 11 (Fig. 1) between the ring 2 and the flange 1ᶜ and is trained over idler sprockets 12 and over an actuating sprocket 13, the latter being mounted upon a vertical steering shaft 14 which carries the usual hand-wheel 15. The axles of the sprockets 12 and the steering shaft 14 are conveniently mounted in the frame A.

The tractor includes a single wheel 16 which is arranged in a diametrical plane of the main frame and is resiliently connected thereto. The construction which as now considered is preferred consists of a pair of semi-elliptic springs 17 and 18 to whose centers the wheel 16 is connected by brackets 19 and 20, respectively, these being clamped or otherwise suitably made fast to said springs. The springs 17 and 18 are arranged at opposite sides of the wheel 16, parallel to the major plane thereof, and are carried by the ring 1, being hung from links or shackles 21 which permit play of the ends of the springs while connecting them to brackets or hangers 22 depending from the flange 1ᵇ.

The wheel 16 is mounted upon a driving axle 23 which operates in suitable bearings 24, 25 and 26. The bearings 24 and 26 adjoin the ends of the axle 23 and the bearings 24 and 25 adjoin the hub of the wheel at opposite sides thereof. The bracket 20 has a U-shaped cross-sectional outline and at its upper ends is provided with collars 28 adapted to be somewhat loosely fitted upon the casings of the bearings 25 and 26 and serving as the connections between said bracket and the axle 23. The bracket 19 is provided at its upper end with a similar collar 29 which is similarly fitted over the casing of the bearing 24. A spacing sleeve 30 is preferably arranged between the collar 29 and the hub of the wheel.

The wheel 16 is driven by a suitable motor 31 which may be arranged at one side of said wheel and as supported, preferably rigidly, from the ring 1. The support for the motor 31 as shown and preferred consists of a pair of bars 32 of angle iron cross section and which are formed at their ends with attachment plates 33, these being fitted in clearances 34 (Fig. 9) formed in the upper section of the ring 1 and being suitably secured to the flange 1ª. The drive from the motor 31 to the wheel 16 utilizes a transverse countershaft 35 which may be located in the rear of said wheel and is driven from the shaft 36 of said motor by suitable gearing, preferably consisting of a chain 37 operating over sprocket wheels on the shafts 35 and 36, respectively. The gearing between the countershaft 35 and the axle 23 extends radially from said shaft at the side of the wheel opposite to that which adjoins the motor and may be of any suitable construction. It preferably includes a two-speed and reverse transmission system 38 of any suitable known form and shown, conventionally, in dotted lines, which is connected by miter gearing 39 to the shaft 35 and by miter gearing 40 to the axle 23.

The mounting of the springs 17 and 18, as described, permits a slight longitudinal displacement of the wheel 16, i. e., a displacement of said wheel in the direction of its plane, relative to the main frame and in connection with this feature and with the gearing between the motor shaft 36 and the axle 23 provision is made for insuring that the displacement of the wheel shall be about an axis coincident with the driving center, i. e., the countershaft 35. Accordingly, the shaft 35 is mounted concentrically within a sleeve 41 which is supported by upright brackets 42 from the ring 1 and is connected to the axle 23 by linkages of equal and constant length at opposite sides of the wheel. In the preferred construction disclosed the linkage at the side of the wheel adjacent the motor consists of a stabilizing or radius rod 43, while the linkage at the opposite side of the wheel consists of the casing 44 which incloses the gear train between the shaft 35 and the axle 23 and which is composed of three parts rigidly connected together, viz: an end part 44ª inclosing the miter gearing 39, an intermediate part 44ᵇ inclosing the change-speed gearing 38, and an end part 44ᶜ inclosing the miter gearing 40. The linkage arms 43—44 are preferably made fast to the sleeve 41 whereby the displacement of either of said arms will be transmitted to the other. Accordingly, the sleeve 41 and the casing part 44ª are capable of turning in bearings 45 provided on the brackets 42, the rod 43 is secured to said sleeve by a clamp 46 and the casing part 44ª is secured to said sleeve by a suitable end coupling or fastening 41ª. The casing part 44ª is preferably provided with a stud or projection 44ᵈ by which it has end support in a bracket bearing 42ª mounted on the ring 1. At its inner end the rod 43 carries a collar 47 concentric and rotatable relatively to the axle 23. This collar may, as shown, be utilized as the casing of the bearing 24 and is fitted within the collar 29 and spacing sleeve 30, the latter having a vertical slot 48 (Fig. 5) through which the rod 43 projects. The casing part 44ᶜ which fits between the upright arms of the bracket 20, is also concentric and rotatable relatively to the axle 23 and may, as shown, have at its ends sleeve-like extensions 49 which are utilized as the casings of the bearings 25 and 26. It is to be noted that a clearance or space is provided between the casing part 44ᶜ and the base of the bracket 20 in order that the spring 18 may have free play relatively to said casing part.

It will be apparent that the rod 43, sleeve 41 and casing 44 form a U which fulcrums about its bow and has said bow co-axial with the counter shaft 35, and that the wheel has an adequate resilient suspension yet is kept positively alined while at the same time the substantial rigidity of the main frame is maintained, compensation is provided for the arc through which the axis of the wheel is movable, shocks or vibrations reacting on the motor and associated parts are reduced to a minimum, and a uniform distribution or balance of the weight is effected.

The control devices and their linkage form no part of the present invention. Any required number of control devices may be employed and they may be of any desired construction, except that compensation must be made for the relative turning movements of the rings 1 and 2. An advantageous construction is disclosed wherein each control device, of which three are shown, in the drawings, includes a ring 50 arranged concentric to the central axis of the rings 1 and 2 and providing a compensating connection between the part which is associated with the relatively stationary ring 2 and the other part which is associated with the rotatable ring 1. Such parts are shown diagrammatically as comprising lever arms 51 associated with the ring 2 and carrying the respective concentric rings 50 and lever arms 52 associated with the ring 1 and provided with angular terminals 53 which overhang and engage the respective rings 50 and preferably carry anti-friction rollers 54.

The arms 51 are suitably offset (see Fig. 1) whereby to avoid interference with relative turning movements of the rings 50 and the angular lever terminals 53, and are pivotally supported by a transverse rod 55 fitted in brackets 56 secured to the framing 57 of the hood (not shown), each arm 51 having an operating pedal or extension 58 which projects rearward through a slot 59 (Fig. 4) in the dash board 60. The arms 52 are pivotally supported by a bracket 61 mounted on a bar or equivalent part 62 by which it is connected to the ring 1. It will be apparent that each ring 50 may be raised or lowered by its arm 51 to effect the operation of the corresponding arm 52 and the parts connected thereto and will function for such purpose in any position which the rings 1 and 2 may assume with relation to one another by a movement of the ring 1 about its central axis and within the limits of the operative steering movement of said ring.

Having fully described my invention, I claim:—

1. A tractor having a frame provided with an annular rotatable element, a single wheel supported from and within said rotatable element to participate in the turning movement thereof, said element having its turning movement about a vertical axis passing centrally through said wheel and the latter functioning both for driving and for steering, leaf springs parallel to said wheel at opposite sides thereof and upon the central portions of which said wheel is mounted, pivoted shackles connected to the ends of said springs and by which they are hung from said element, a motor supported by said element at one side of said wheel, a transverse counter shaft supported by said element at a fixed elevation and driven by said motor, gearing between said shaft and said wheel at the side of the latter opposite said motor, and radius connections between said wheel at opposite sides thereof and said shaft whereby the wheel, when displaced, will move about the shaft as an axis, said connections including a casing for said gearing.

2. A tractor having a frame provided with an annular rotatable element, a single wheel supported from and within said rotatable element to participate in the turning movement thereof, said element having its turning movement about a vertical axis passing centrally through said wheel and the latter functioning both for driving and for steering, springs at opposite sides of said wheel to which the latter is connected, said springs providing balanced support for said frame relatively to said wheel, a counter shaft supported by said frame transverse to said wheel, a motor supported by said frame at one side of said wheel and geared to said counter shaft, gearing between said counter shaft and said wheel at the side thereof opposite said motor, and radius connections between said wheel at opposite sides thereof and said shaft whereby the wheel, when displaced, will move about the shaft as an axis.

3. In a tractor, a rotatable annular frame element, a single wheel located centrally within said element, a pair of springs connected to said element at opposite sides of said wheel and upon which said wheel is mounted, a motor supported by said element at one side of said wheel, a counter shaft supported by said element transverse to said wheel and to which said motor is geared, gearing between said counter shaft and said wheel at the side thereof opposite said motor, and radius connections between said wheel and said counter shaft at opposite sides of said wheel whereby the wheel, when displaced, will move about the shaft as an axis, said connections including a casing for said gearing.

4. In a tractor, a rotatable annular frame element, a single wheel disposed centrally within said frame element, a counter shaft supported by said frame element transverse to said wheel, a system of gearing between said counter shaft and said wheel consisting of a change speed gear train, miter gear elements connecting said train at one end to said counter shaft and other miter gear elements connecting said train at the other end of said wheel, a motor supported by said element at the side of said wheel opposite said gearing and geared to said counter shaft, radius connections between said wheel at opposite sides thereof and said counter shaft, and springs at opposite sides of said wheel upon which the latter is mounted and which are connected to said element.

5. A tractor having an annular frame composed of inner and outer rings relatively rotatable about a common central axis, the inner ring being of channeled cross section and having an annular vertical portion and upper and lower annular flanges projecting outward from said vertical portion and the outer ring being disposed vertically between said flanges and having a centrally arranged annular flange projecting inward toward said vertical portion, vertically disposed roller bearings carried by the outer ring and engaging the portions of said outwardly projecting flanges which overhang said centrally arranged flange and horizontally disposed roller bearings also carried by the outer ring and operating in the horizontal plane of said centrally arranged flange to engage the vertical portion of the inner ring.

In testimony whereof I have hereunto set my hand in presence of two subscribing witnesses.

CLIFFORD MYRAM MARSH.

Witnesses:
SARAH BOWNE MARSH,
DANIEL F. IMRIE.